(12) United States Patent  
Yoshimatsu et al.

(10) Patent No.: US 8,879,244 B2  
(45) Date of Patent: Nov. 4, 2014

(54) DISPLAY DEVICE

(75) Inventors: Tomoyuki Yoshimatsu, Tokyo (JP); Yoichiro Eshita, Tokyo (JP); Takuya Toriumi, Kanagawa (JP); Tatsuya Sakata, Tokyo (JP)

(73) Assignee: Sony Corporation (JP)

( * ) Notice: Subject to any disclaimer, the term of this patent is extended or adjusted under 35 U.S.C. 154(b) by 118 days.

(21) Appl. No.: 13/186,540

(22) Filed: Jul. 20, 2011

(65) Prior Publication Data

US 2012/0026658 A1   Feb. 2, 2012

(30) Foreign Application Priority Data

Aug. 2, 2010   (JP) ................................ P2010-173866

(51) Int. Cl.
G06F 1/16   (2006.01)
H04N 5/64   (2006.01)
H05K 5/02   (2006.01)
H05K 7/00   (2006.01)
H05K 5/00   (2006.01)

(52) U.S. Cl.
CPC ... H05K 5/02 (2013.01); H04N 5/64 (2013.01)
USPC ............. 361/679.21; 361/679.58; 361/729; 349/58; 348/794; 348/836

(58) Field of Classification Search
USPC ............. 361/679.21–679.3, 679.55–679.58
See application file for complete search history.

(56) References Cited

U.S. PATENT DOCUMENTS

| | | | | |
|---|---|---|---|---|
| 5,268,816 | A  * | 12/1993 | Abell et al. | 361/679.09 |
| 7,301,761 | B2 * | 11/2007 | Merz et al. | 361/679.27 |
| 7,463,482 | B2 * | 12/2008 | Chien et al. | 361/679.55 |
| 7,778,023 | B1 * | 8/2010 | Mohoney | 361/679.41 |
| 8,031,174 | B2 * | 10/2011 | Hamblin et al. | 345/158 |
| 2007/0039131 | A1 * | 2/2007 | Rude | 16/277 |
| 2007/0063633 | A1 * | 3/2007 | Yokota et al. | 313/495 |
| 2008/0089018 | A1 * | 4/2008 | Kim et al. | 361/681 |
| 2009/0244437 | A1 * | 10/2009 | Yamaguchi et al. | 349/60 |

FOREIGN PATENT DOCUMENTS

JP   2009-258489 A   11/2009

* cited by examiner

Primary Examiner — Zachary M Pape
Assistant Examiner — Douglas Burtner
(74) Attorney, Agent, or Firm — Lerner, David, Littenberg, Krumholz & Mentlik, LLP

(57) ABSTRACT

A display device includes: a front plate having a transparent board and a mounting frame, the mounting frame having a bottom attached to a back face of the transparent board and a side perpendicular to the bottom, the front plate having a long hole in the side; a display panel disposed on a back face side of the front plate; and a mounting member having a fixed section fixed to a back face of the display panel and a locking section extending from the fixed section and loosely inserted into the long hole of the mounting frame.

11 Claims, 18 Drawing Sheets

US 8,879,244 B2

DISPLAY DEVICE

CROSS-REFERENCE TO RELATED APPLICATION

The present application claims priority from Japanese Patent Application No. JP 2010-173866 filed in the Japanese Patent Office on Aug. 2, 2010, the entire content of which is incorporated herein by reference.

BACKGROUND

The present disclosure relates to a display device suitable for a thin-screen television or the like.

In recent years, display devices for various broadcast waves or video images have become increasingly larger in size and thinner, and have been desired to have a structure in which an image display region is large, a region other than the display region (a frame region) is narrow, and the thickness of a housing is reduced. For such a thin display device, it has been suggested to provide a transparent front plate (a protective plate) made of glass or the like, on a front face of a display panel, in order to secure strength of the display panel (for example, refer to Japanese Unexamined Patent Application Publication No. 2009-258489).

SUMMARY

However, in such a currently-available thin display device, a bezel (frame) covering a frame region of the front plate is provided, and a display panel or a rear cover is attached to this bezel. Therefore, it is desired to provide a mounting boss at each of four sides of the bezel, leading to an increase in the area of the frame region or in the thickness of a housing, to allow the width and the height of the boss. Further, there is such a disadvantage that when a bezel is not provided, it is difficult to fix the display panel and the like.

In view of the foregoing, it is desirable to provide a display device in which a frame may be narrowed and thickness may be reduced.

According to an embodiment of the present disclosure, there is provided a display device having the following (A) to (C).

(A) A front plate having a transparent board and a mounting frame, the mounting frame having a bottom attached to a back face of the transparent board and a side perpendicular to the bottom, the front plate having a long hole in the side.

(B) A display panel disposed on a back face side of the front plate.

(C) A mounting member having a fixed section fixed to a back face of the display panel and a locking section extending from the fixed section and loosely inserted into the long hole of the mounting frame.

In the display device according to the above-described embodiment of the present disclosure, the fixed section of the mounting member is fixed to the back face of the display panel, and the locking section is loosely inserted into the long hole in the mounting frame of the front plate, and therefore the front plate and the display panel are coupled.

According to the display device in the above-described embodiment of the present disclosure, the fixed section of the mounting member is fixed to the back face of the display panel, and the locking section is loosely inserted into the long hole in the mounting frame of the front plate. Therefore, it is possible to couple the front plate and the display panel without a bezel or a mounting boss, which are typically used, and therefore a frame may be narrowed and thickness may be reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF EMBODIMENT

An embodiment of the present disclosure will be described below in detail with reference to the drawings. Incidentally, the description will be provided in the following order.

1. Embodiment
  (1) Entire configuration
  (2) Coupling between front plate and display panel by mounting member
  (3) Coupling between back chassis of display pane and rear cover
  (4) Coupling between middle chassis of display panel and rear cover
  (5) Coupling between front plate and rear cover (an example in which a stud for mounting a rear cover is of sliding type.)
2. Modification 1 (an example in which a speaker box is attached to a stud for mounting a rear cover.)

[Entire Configuration]

Figure 1:
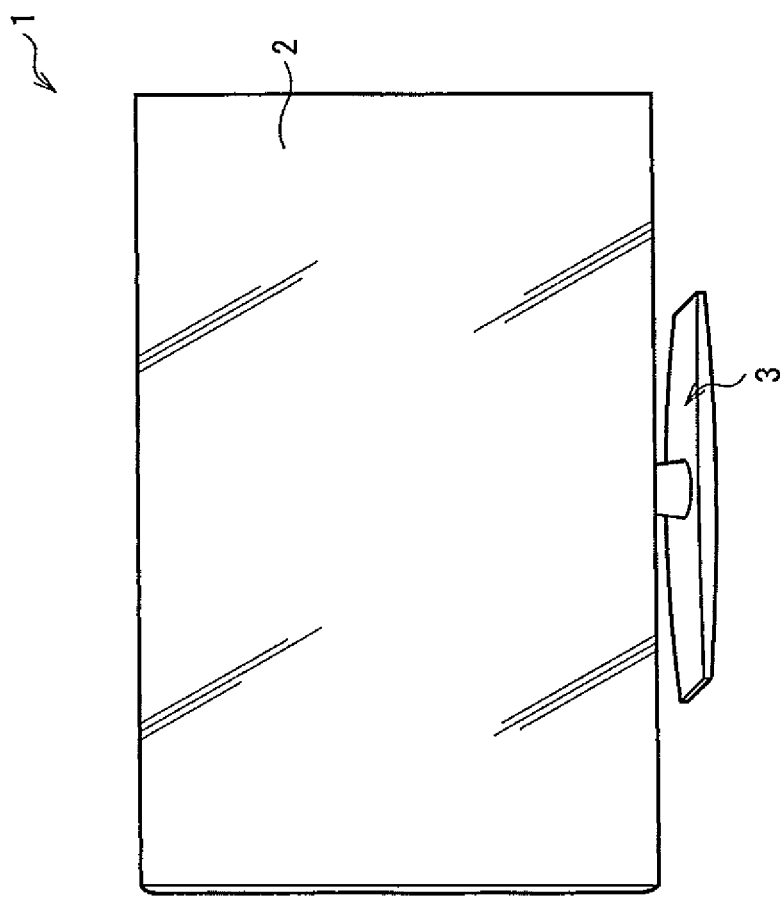
FIG. 1 is a perspective diagram illustrating an appearance of a display device according to an embodiment of the present disclosure.

FIG. 1 illustrates an appearance of a display device according to an embodiment of the present disclosure. This display device 1 is used, for example, as a thin-screen television device, and has a structure in which a flat-shaped main section 2 for image display is supported by a stand 3. It is to be noted that the display device 1 is used as a stationary type of device by being placed on a horizontal surface such as a floor, a shelf, or a table, in a state in which the stand 3 is attached to the main section 2, but the display device 1 may be used as a wall type of device in a state in which the stand 3 is removed from the main section 2.

Figure 2:
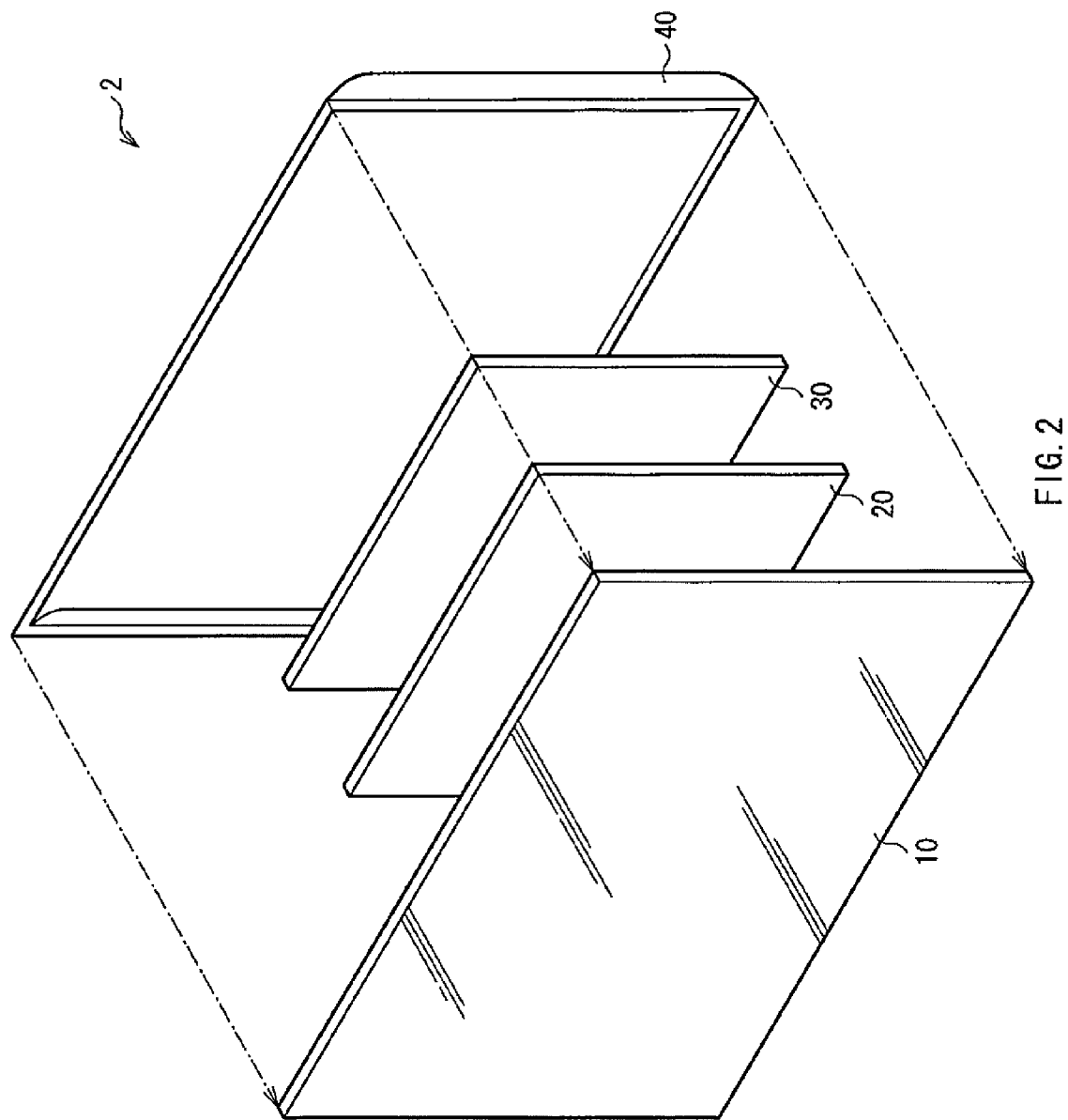
FIG. 2 is an exploded perspective diagram schematically illustrating a structure of a main section illustrated in FIG. 1.

FIG. 2 is an exploded view of the main section 2 illustrated in FIG. 1. The main section 2 has, for example, a front plate 10, an adhesive layer 20, a display panel 30 of liquid crystal or the like, and a rear cover 40, arranged sequentially from the front side (viewer's side). The front plate 10 is made of transparent glass or the like, allowing a user to view videos displayed on the display panel 30 through the front plate 10 and the adhesive layer 20.

The adhesive layer 20 is disposed between the front plate 10 and the display panel 30, and bonds the front plate 10 and the display panel 30 together across the entire surface of the display panel 30. This makes it possible for a viewer to see as if an image of the display panel 30 is displayed on the front face of the front plate 10. Without the adhesive layer 20, the viewer feels space between the front face of the front plate 10 and the display panel 30, and recognizes that an image is displayed on the front face of the display panel 30. The adhesive layer 20 is made of, for example, an ultraviolet curing resin.

The display panel 30 is disposed on the back face side of the front plate 10, and configured by using, for example, a liquid crystal display element. It is to be noted that the display panel 30 may employ a display element of plasma, organic EL (Electroluminescence), inorganic EL, electrodeposition, or electrochromic type, other than the liquid crystal.

The rear cover 40 is disposed on the back face side of the display panel 30, and is made of a resin material such as ABS resin (achrylonitrile-butadiene-styrene resin), PS (polystyrene), a material formed by adding ABS resin to PC resin (polycarbonate resin), or a material formed by adding PPE (polyphenylene ether) to PS.

[Coupling Between Front Plate and Display Panel by Mounting Member]

Figure 3:
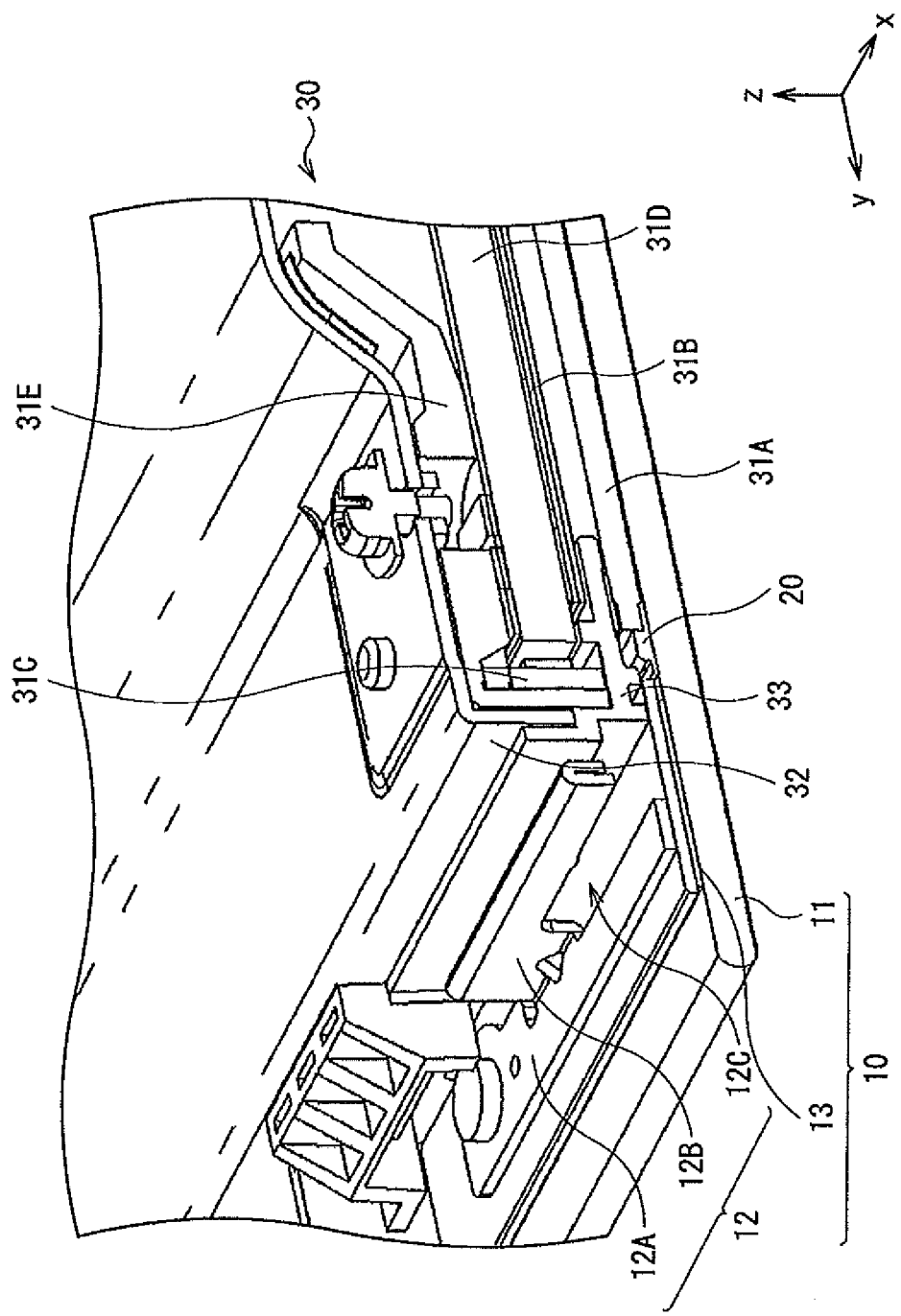
FIG. 3 is a partially cutaway perspective diagram of an internal structure in which a front plate, an adhesive layer, and a display panel illustrated in FIG. 2 are partially cut off.

FIG. 3 illustrates an internal structure in which the front plate 10, the adhesive layer 20, and the display panel 30 illustrated in FIG. 2 are partially cut off. It is to be noted that in and after FIG. 3, a direction perpendicular to a main surface of the display panel 30 is assumed to be a z direction (a rearward direction), a leftward direction when viewed from the back face of the display panel is assumed to be an x direction (a leftward-in-rear-view direction), and an upward direction when viewed from a lower part of the display panel 30 is assumed to be a y direction (an upward direction). Further, in the following description, by considering the x, y, and z directions in a broad sense, a lateral direction including the leftward-in-rear-view direction will be referred to as an X direction, a vertical direction including the upward direction will be referred to as a Y direction, and a front-back direction including the rearward direction will be referred to as a Z direction.

The front plate 10 has a mounting frame 12 for mounting the display panel 30, on the back face of a transparent board 11 made of glass. The mounting frame 12 is made of, for example, aluminum (Al) sheet metal, and has a bottom 12A attached to the back face of the transparent board and a side 12B perpendicular to this bottom 12A. The bottom 12A is affixed to the transparent board 11 by, for example, a double-faced adhesive tape 13. The side 12B has a long hole (a slit) 12C. This long hole 12C is used to fasten the display panel 30 and the front plate 10 to each other by a mounting member 50 to be described later. The longitudinal direction of the long hole 12C is parallel to the surface of the front plate 10 (the transparent board 11), as well as being parallel to an edge of each of the front plate 10 (the transparent board 11) and the display panel 30, and is, for example, in the X direction (lateral direction) at an upper edge.

The display panel 30 is, for example, a liquid crystal display element that has a panel main body 31A including liquid crystal cells, an optical sheet 31B, a light source 31C formed of LED (Light Emitting Diode) as well as a light-guiding plate 31D, and a radiating member 31E, in this order from a side where the front plate 10 is provided. The adhesive layer 20 is provided between the panel main body 31A and the transparent board 11. The back face of the radiating member 31E is covered by a back chassis 32 made of a metallic material such as an aluminum (Al) or magnesium (Mg) metal sheet, or a steel sheet. Further, between the panel main body 31A and the back chassis 32, a middle chassis (middle mold) 33 made of a resin material is provided. The middle chassis 33 is disposed along a periphery of the panel main body 31A to fasten the optical sheet 31B. Examples of a resin material forming the middle chassis 33 include ABS resin, PS, a material formed by adding ABS resin to PC resin, or a material formed by adding PPE to PS, like the rear cover 40.

Figure 4:
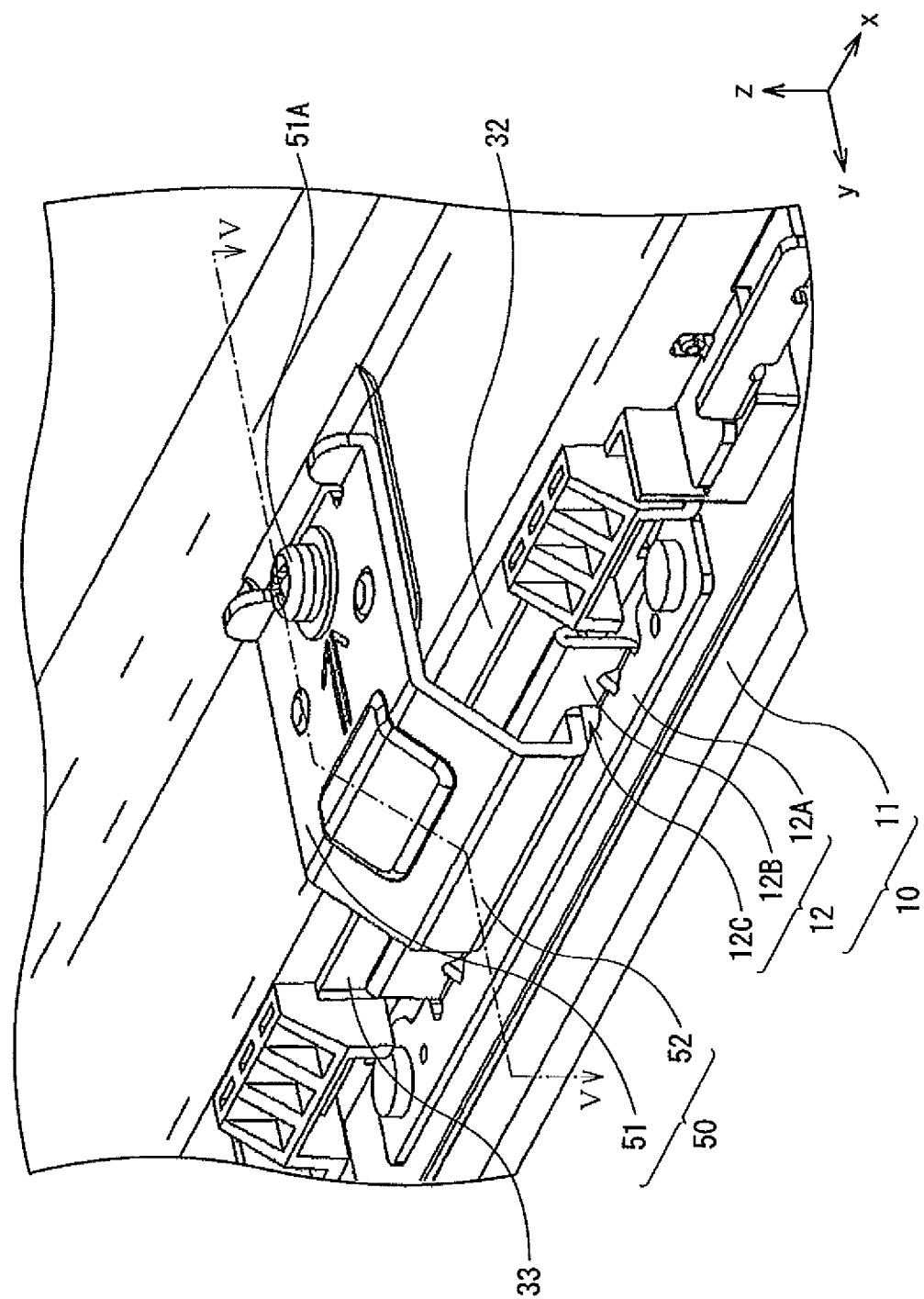
FIG. 4 is a perspective diagram illustrating a state in which the front plate and the display panel are coupled by a mounting member.
Figure 5:
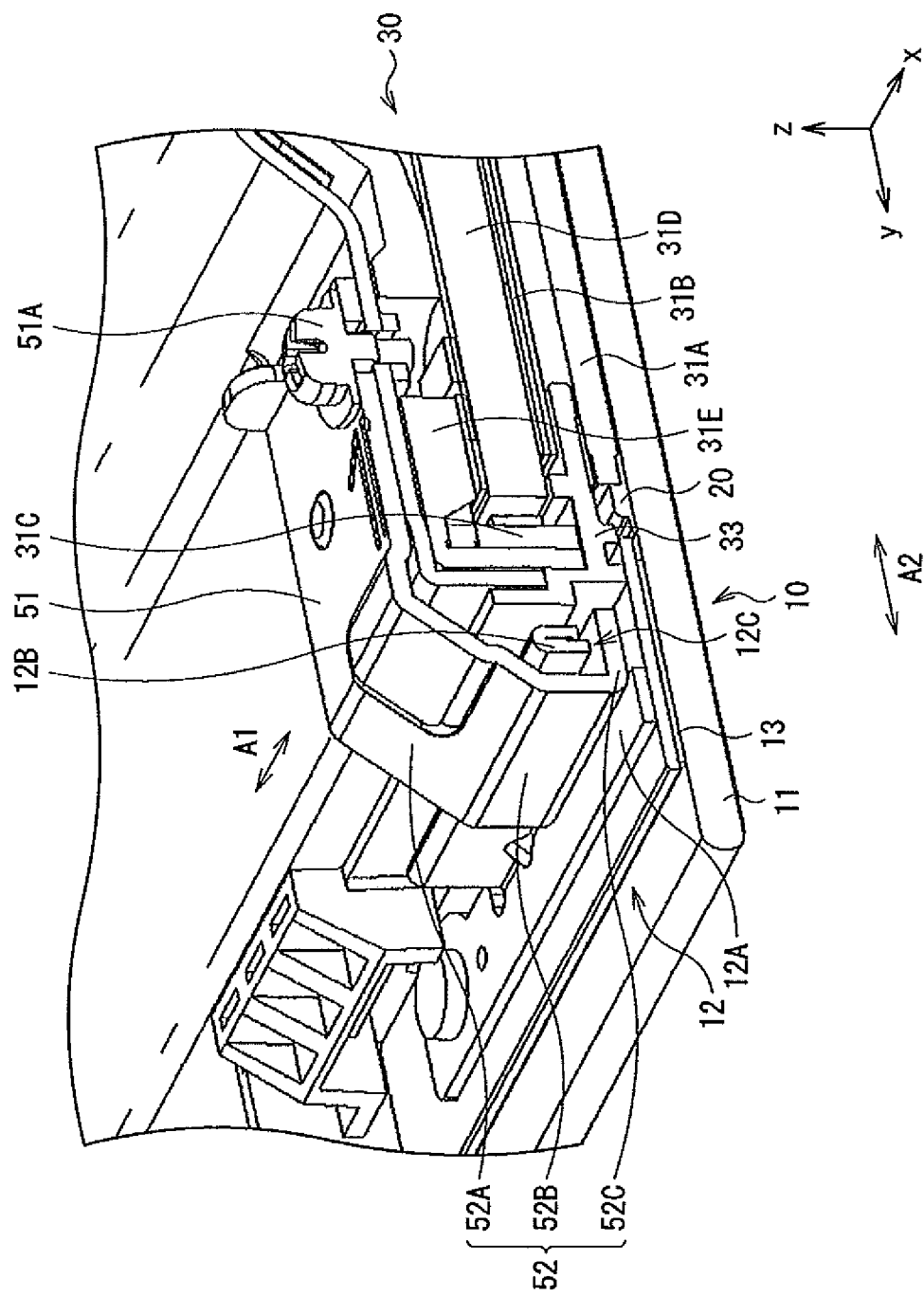
FIG. 5 is a partially cutaway perspective diagram illustrating a structure of a cross section taken along a line V-V in FIG. 4.

FIG. 4 illustrates an appearance of the mounting member 50 that couples the display panel 30 and the front plate 10 illustrated in FIG. 3. Further, FIG. 5 illustrates a cross-sectional structure taken by cutting off a part of the mounting member 50 illustrated in FIG. 4. The mounting member is made of, for example, a metallic material such as a steel sheet, or a metal sheet of aluminum (Al), magnesium, or stainless steel, and has a fixed section 51 fixed to the back face of the display panel 30, and a locking section 52 extending from the fixed section 51 and loosely inserted into the long hole 12C of the mounting frame 12. This makes it possible for this display device 1 to have a narrower frame and be thinner.

In other words, since the fixed section 51 is fixed to the back chassis 32 by, for example, a screw 51A, and the locking section 52 is caught in the long hole 12C of the mounting frame 12, this mounting member 50 enables coupling between the front plate 10 and the display panel 30 without using a bezel or a mounting stud which are typically used. Further, the locking section 52 has a shape that agrees with the shapes of the display panel 30 and the mounting frame 12. Specifically, the locking section 52 has, for example, a first surface 52A slanting from an end of the top surface of the back chassis 32 to an upper end of the side 12B of the mounting frame 12, a second surface 52B extending along the side 12B of the mounting frame 12, and a third surface 52C bent to extend from a lower end of this second surface 52B. The third surface 52C is caught in the long hole 12C. Therefore, as compared to a case where a standing mounting boss is provided, a change in external form and an increase in dimensions of the display panel 30 caused by mounting the mounting member 50 are remarkably small. Accordingly, it is possible to narrow the frame and reduce the thickness.

Furthermore, the mounting member 50 is fixed to the back chassis 32 of the display panel 30, but is in a condition of not being fixed to the mounting frame 12 of the front plate 10. Therefore, the locking section 52 is movable in the long hole 12C along a longitudinal direction A1 of the long hole 12C and a direction A2 passing through the long hole 12C. For this reason, when a thermal contraction difference occurs between the back chassis 32 made of metal and the transparent board 11 made of glass, due to a rise in the ambient temperature or heat produced at the time of driving the display device 1, the thermal contraction difference may be eased by the mounting member 50. In other words, the mounting member 50 enables fixation between the front plate 10 and the display panel 30 in the Z direction (front-back direction), while allowing free deformation in the X direction (lateral direction) or the Y direction (vertical direction) due to expansion and shrinkage by heat. Therefore, it is possible to avoid excessive stress on the front plate 10 at the time of thermal deformation, and thereby suppressing breakage and damage in the front plate 10 caused by the thermal contraction difference.

[Coupling Between Back Chassis of Display Panel and Rear Cover]

Figure 6:
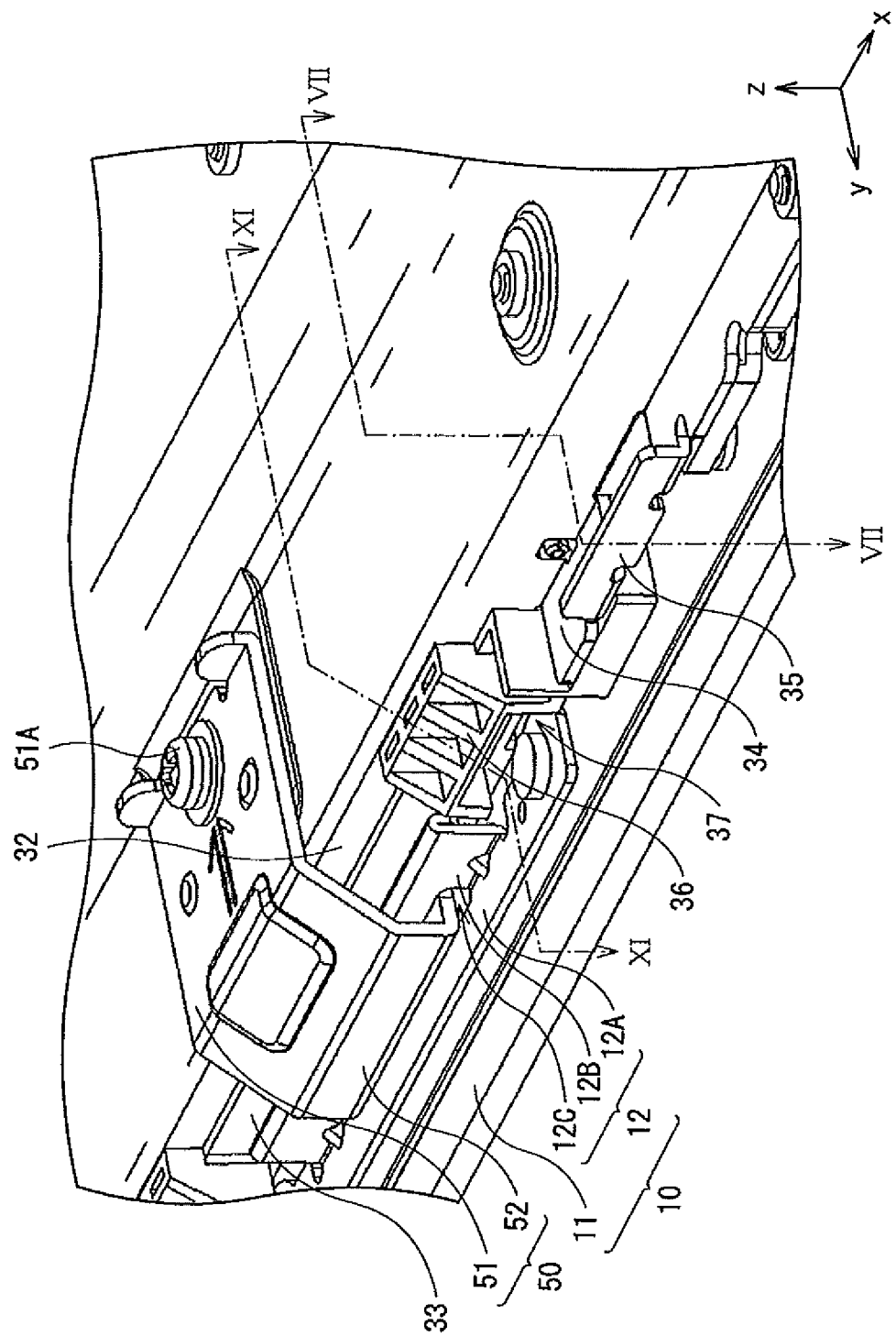
FIG. 6 is a perspective diagram illustrating a part of the display panel illustrated in FIG. 2.
Figure 7:
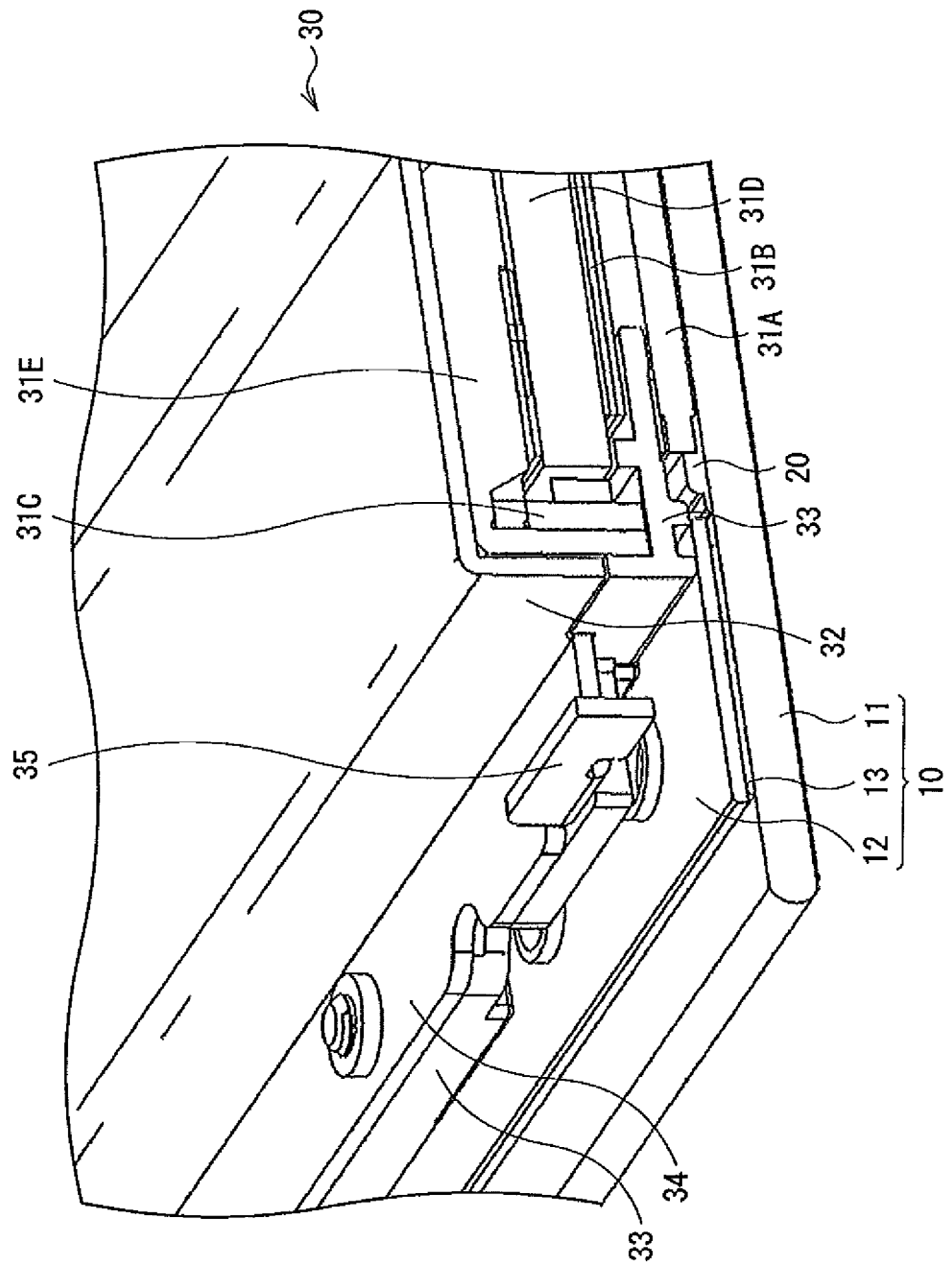
FIG. 7 is a partially cutaway perspective diagram illustrating a structure of a cross section taken along a line VII-VII in FIG. 6.

FIG. 6 illustrates a part of the display panel 30 illustrated in FIG. 2. Further, FIG. 7 illustrates a cross-sectional structure in which the display panel 30 illustrated in FIG. 6 is partially cut off. Around the display panel 30, a flange section 34 is provided in parallel to the transparent board 11. In a part of the flange section 34, a standing wall 35 projecting from an edge of the flange section 34 toward the rear cover 40 is provided. This standing wall 35 is provided to couple the display panel 30 and the rear cover 40, and suppress displacement of the rear cover 40 in the X direction (lateral direction) or the Y direction (vertical direction). Coupling the rear cover 40 to the display panel 30 makes it possible to reduce a burden on the front plate 10, suppressing occurrence of breakage, damage, and the like in the front plate 10, as compared to a case where the rear cover 40 is fastened to the mounting frame 12 of the front plate 10.

It is desirable that, for example, the flange section 34 and the standing wall 35 be made of the same material as that of the back chassis 32, and provided integrally with the back chassis 32. This eliminates provision of a special component, making it possible to reduce components and incorporate a structure for mounting the rear cover 40 in a narrow frame. It is to be noted that the flange section 34 overlaps an outer edge portion of the middle chassis 33 and is fixed by a screw and the like.

Figure 8:
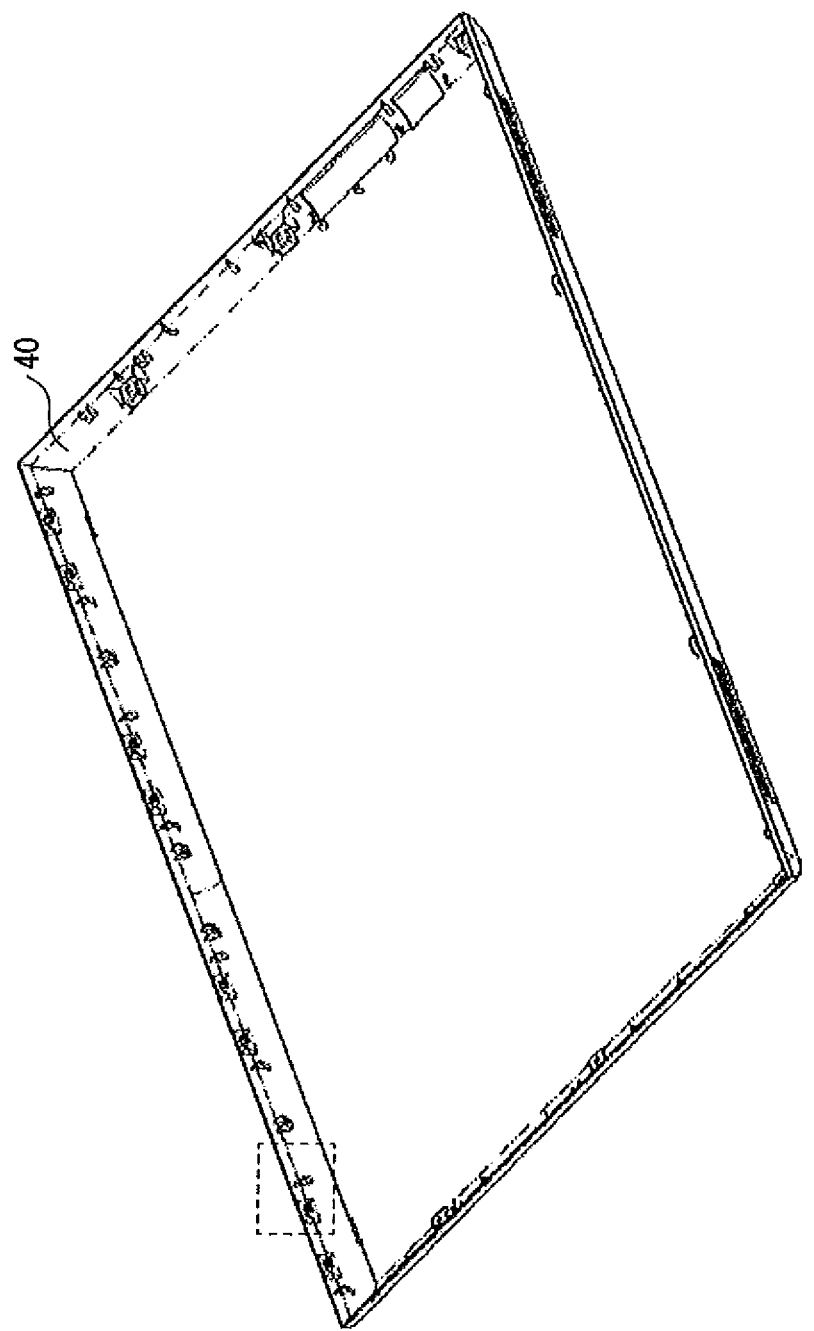
FIG. 8 is a perspective diagram illustrating the inside of a rear cover.
Figure 9:
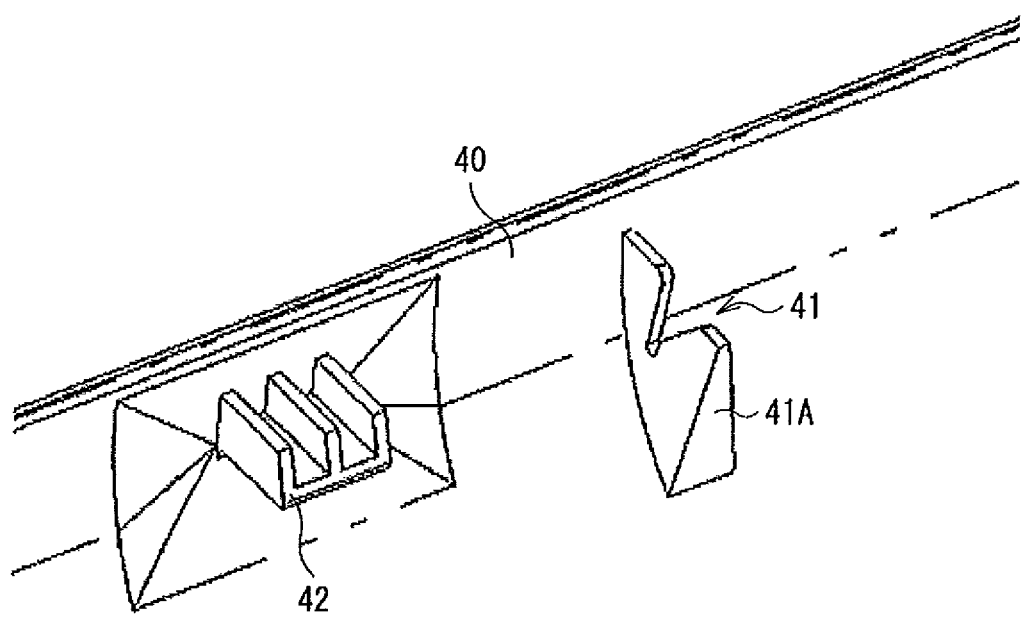
FIG. 9 is an enlarged perspective diagram illustrating a part of the inside of the rear cover.

FIG. 8 illustrates the inside of the rear cover 40 depicted in FIG. 2, and FIG. 9 illustrates an enlarged view of a part surrounded by a dotted line in FIG. 8. Provided inside the rear cover 40 is a rib 41A having a concave section 41 to engage with the standing wall 35.

The standing walls 35 and the concave sections 41 (the ribs 41A) are provided, for example, on upper, right, and left edges of the display panel 30 and the rear cover 40. An extending direction of the standing wall 35 is the X direction (lateral direction) on the upper edge of the display panel 30, and the Y direction (vertical direction) on the right and left edges of the display panel 30. The quantity and the interval of the standing walls 35 and the concave sections 41 are not limited in particular.

Figure 10:
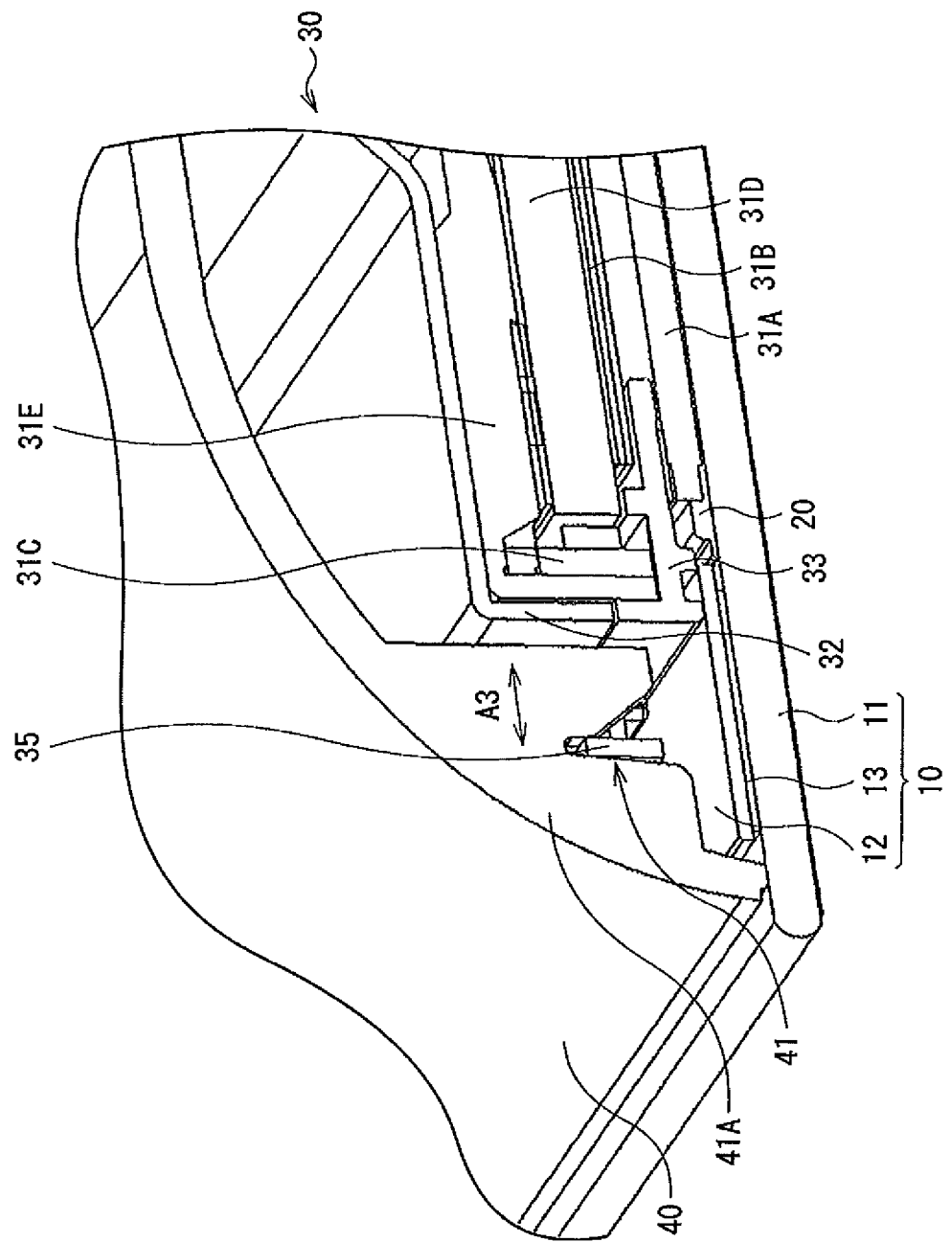
FIG. 10 is a perspective diagram illustrating a state in which a standing wall illustrated in FIG. 6 and a concave section illustrated in FIG. 9 are engaged with each other.

FIG. 10 illustrates a state in which the standing wall 35 of the back chassis 32 illustrated in FIG. 6 is engaged in the concave section 41 of the rear cover 40 illustrated in FIG. 9. Engagement between the standing wall 35 and the concave section 41 restricts movement between the back chassis 32 of the display panel 30 and the rear cover 40 in a direction A3 perpendicular to the extending direction of the standing wall 35 and parallel to the surface of the front plate 10 (the transparent board 11). In other words, movement in the Y direction (vertical direction) is restricted on the upper edge of the display panel 30, and movement in the X direction (lateral direction) is restricted on the right and left edges. This makes it possible to suppress displacement between the back chassis 32 of the display panel 30 and the rear cover 40 without using a screw, and prevent the rear cover 40 from being misaligned or dropping off.

In addition, by engaging the rear cover 40 with the standing wall 35 of the back chassis 32 in this way, it is possible to produce resistance to misalignment between components. The misalignment between components is caused by dimensional misalignment of each component, and the larger the number of components is, the greater the total dimensional misalignment is. Providing the standing wall 35 integrally with the back chassis 32 makes it possible to suppress the number of components, reduce the accumulation of dimensional misalignment, and produce resistance to the occurrence of the misalignment between components.

[Coupling Between Middle Chassis of Display Panel and Rear Cover]

Moreover, as illustrated in FIG. 9, inside the rear cover 40, a claw 42 is provided together with the concave section 41. The claw 42 is used to couple the display panel 30 and an upper edge of the rear cover 40, and provided at the upper edge of the rear cover 40 in a position different from where the concave section 41 is provided.

Figure 11:
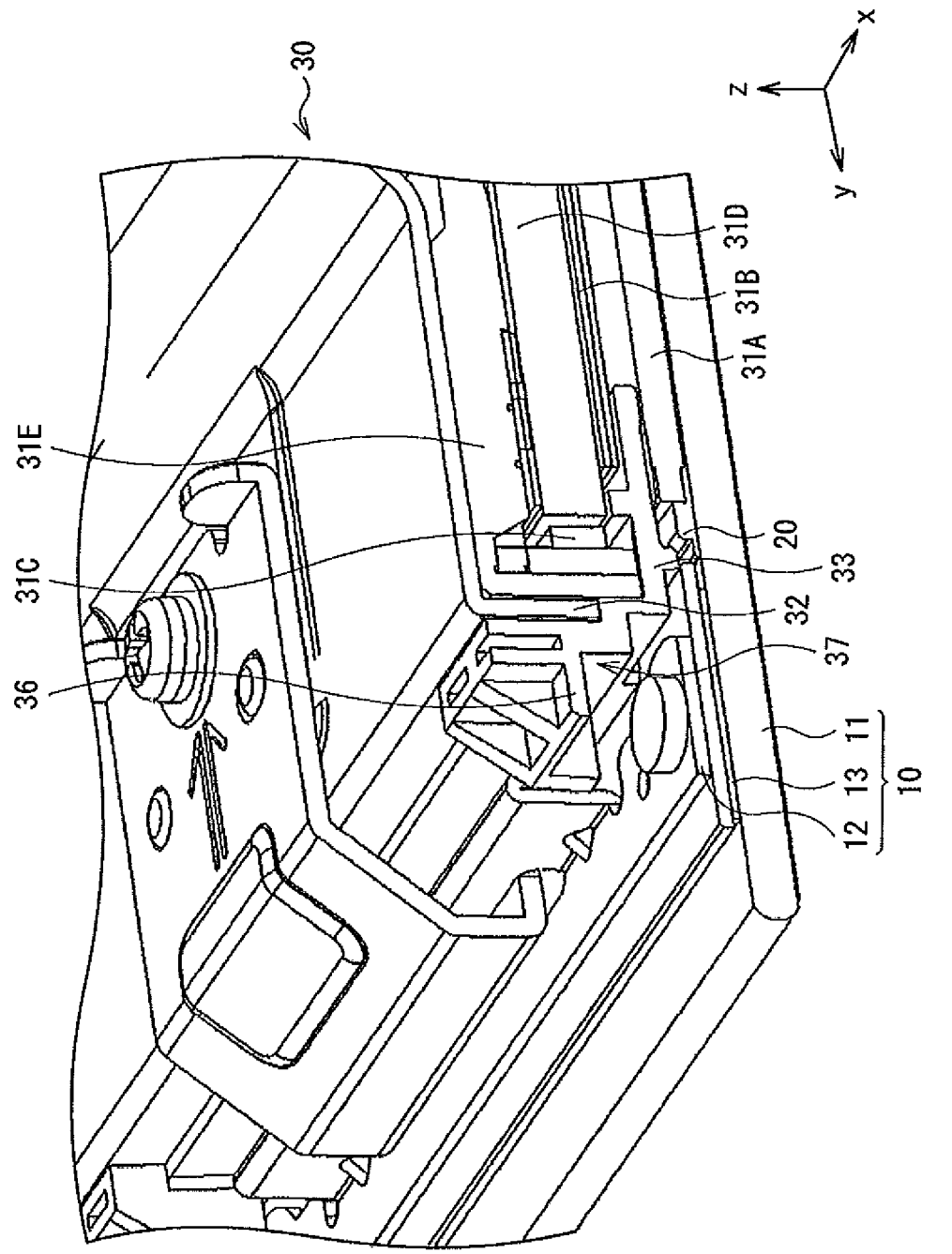
FIG. 11 is a partially cutaway perspective diagram illustrating a structure of a cross section taken along a line XI-XI in FIG. 6.

FIG. 11 illustrates a cross-sectional structure in which the display panel 30 illustrated in FIG. 6 is partially cut off. A protruding section 36 is provided on a periphery of the upper edge of the display panel 30, and a bag-like section 37 capable of holding the claw 42 of the rear cover 40 is provided between the protruding section 36 and the front plate 10. This bag-like section 37 is provided to couple the display panel 30 and the rear cover 40, and suppress displacement of the rear cover 40 in the Z direction (front-back direction). In addition, engagement and fixation of the rear cover 40 in and to the display panel 30 by using the bag-like section 37 makes it difficult to impose a load onto the front plate 10, making it possible to produce resistance to breakage or damage in the front plate 10, as compared to a case in which the rear cover 40 is fastened to the mounting frame 12 of the front plate 10.

It is desirable that the protruding section 36 be provided integrally with the middle chassis 33. This makes it possible to incorporate a structure for mounting the rear cover 40 in a narrow frame. In addition, the protruding section 36 may be made of a resin material in a manner similar to the claw 42 of the rear cover 40, and therefore abrasion of the protruding section 36 and the claw 42 may be suppressed.

Figure 12:
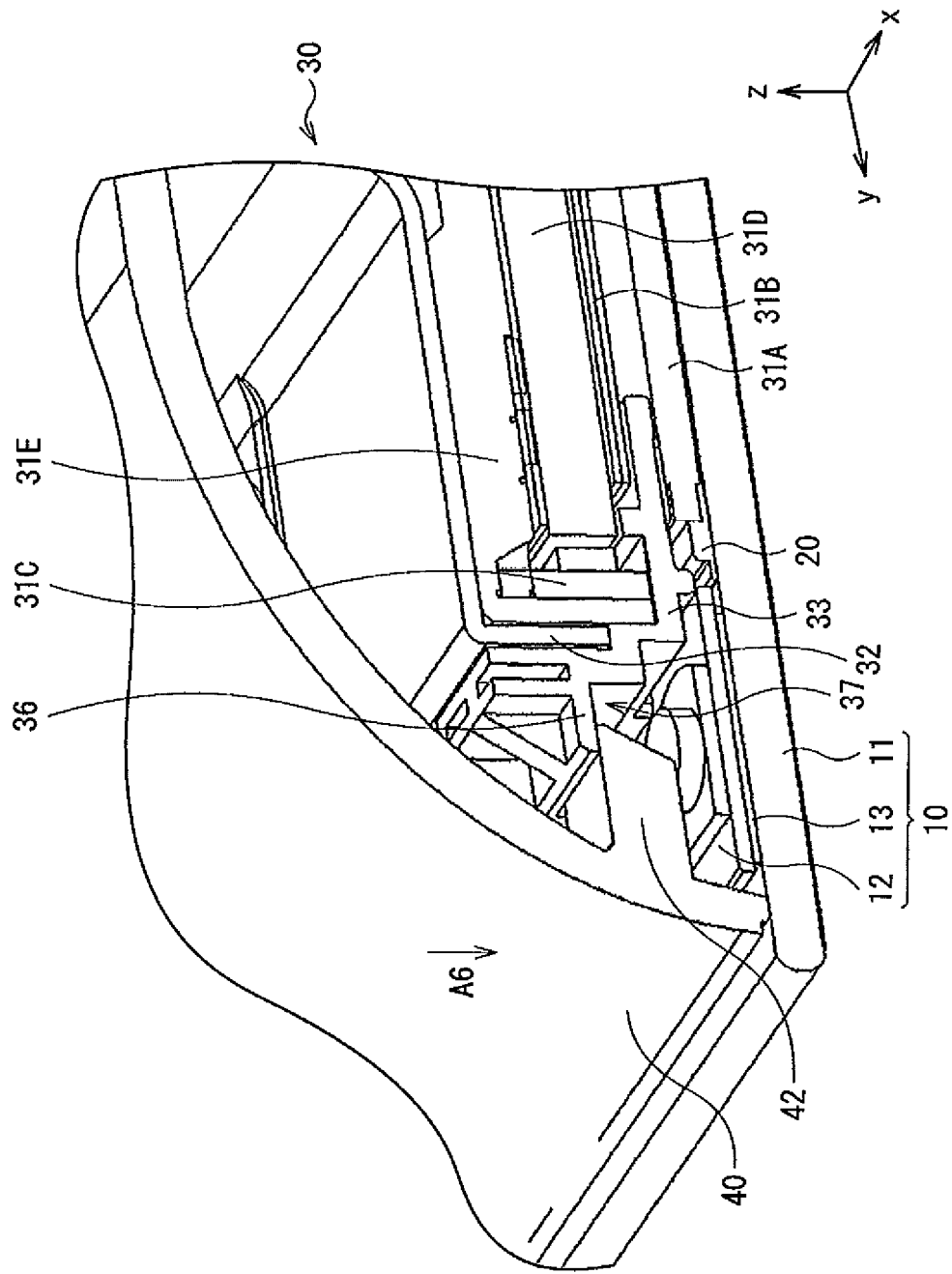
FIG. 12 is a perspective diagram illustrating a state in which a claw illustrated in FIG. 9 is engaged in a protruding section illustrated in FIG. 11.

FIG. 12 illustrates a state in which the claw 42 of the rear cover 40 illustrated in FIG. 9 is engaged in the protruding section 36 of the middle chassis 33 illustrated in FIG. 11. The claw 42 of the rear cover 40 is held by the bag-like section 37 between the protruding section 36 and the front plate 10. This makes it possible to suppress movement of the middle chassis 33 of the display panel 30 and the rear cover 40 in the Z direction (front-back direction) without using a screw, and prevent the rear cover 40 from being misaligned or dropping off.

[Coupling Between Font Plate and Rear Cover at Lower Edges]

Figure 13:
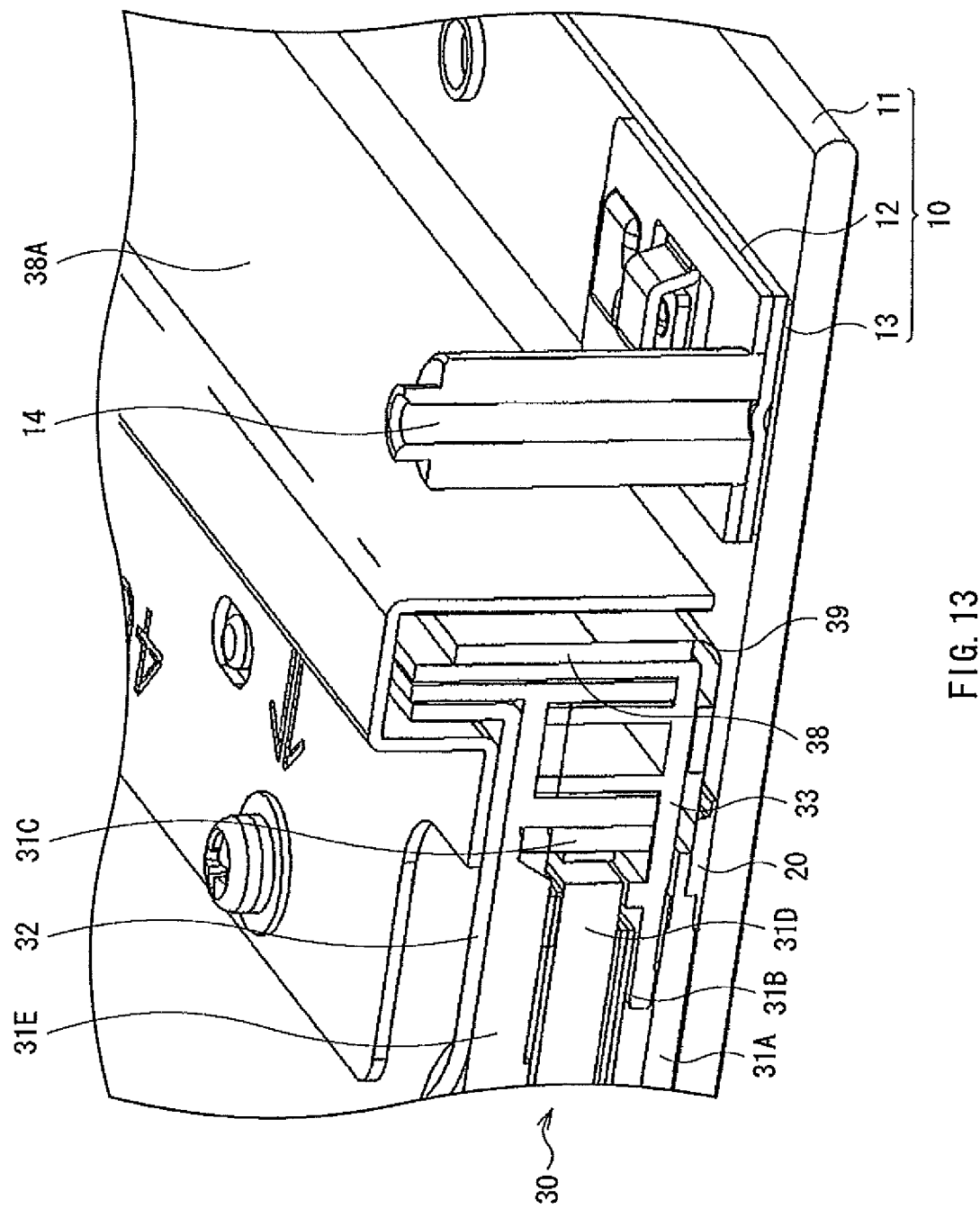
FIG. 13 is a partially cutaway perspective diagram illustrating an internal structure in which lower edges of the front plate, the adhesive layer, and the display panel illustrated in FIG. 2 are partially cut off.

FIG. 13 illustrates a structure at the lower edges of the front plate 10, the adhesive layer 20, and the display panel 30 illustrated in FIG. 2. A driving circuit board 38 is provided on a side at the lower edge of the display panel 30. The driving circuit board 38 is disposed in a vertical posture along a side of the middle chassis 33 and connected to the panel main body 31A via a flexible board 39. An exterior of the driving circuit board 38 is covered by a cover member 38A.

A stud 14 is provided at the lower edge of the mounting frame 12. This stud 14 is provided, for example, to fix the lower edge of the rear cover 40 with a screw. In addition, the stud 14 is removably attachable to the mounting frame 12, and allowed to avoid damaging the driving circuit board 38 and the flexible board 39 by contacting these boards, at the time of repair (rework) of the display device 1. Such a removable stud 14 is extremely effective, especially when the front plate 10 and the display panel 30 are bonded across the respective surfaces by the adhesive layer 20, and the display panel 30 is not allowed to be separated from the front plate 10 at the time of repair of the display device 1, and/or when a frame region is narrow.

Figure 14:
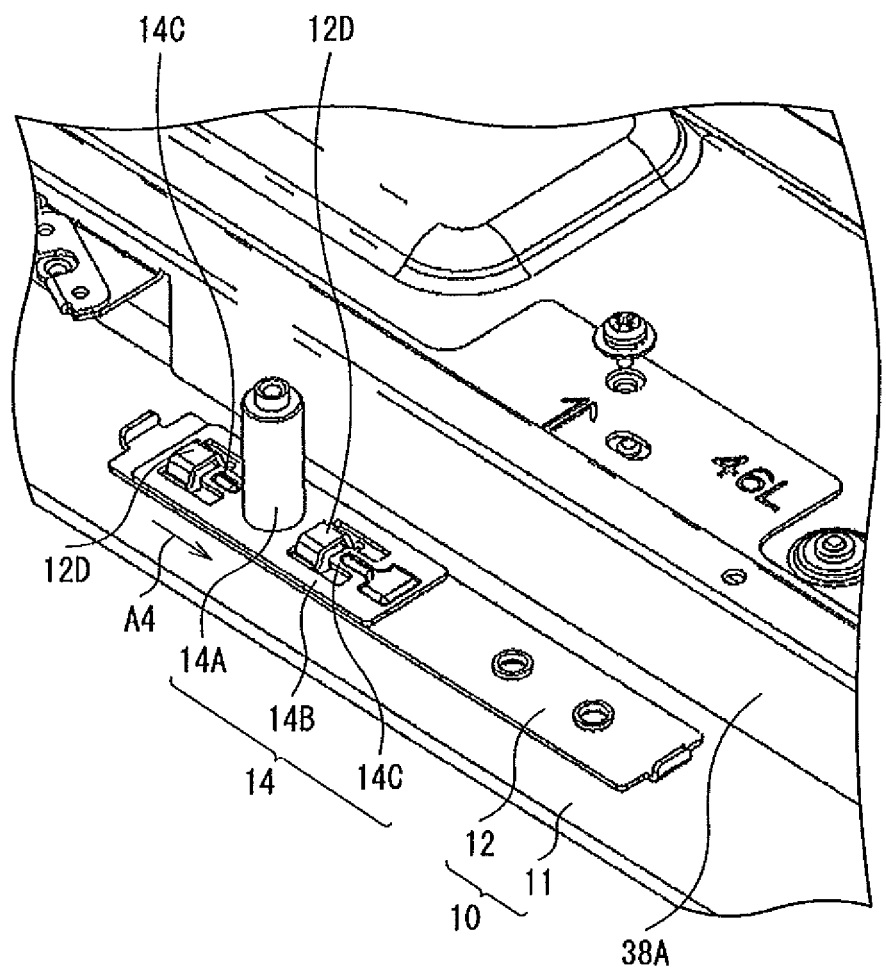
FIG. 14 is a perspective diagram illustrating a structure of a stud illustrated in FIG. 12.

FIG. 14 illustrates a specific structure of the stud 14 illustrated in FIG. 13. The stud 14 has, for example, a stud main body 14A and a base section 14B attached to a lower end of this stud main body 14A. The base section 14B has sliding-use projections 14C on both sides of the stud main body 14A, which project in parallel with the base section 14B in the same direction.

Figure 15:
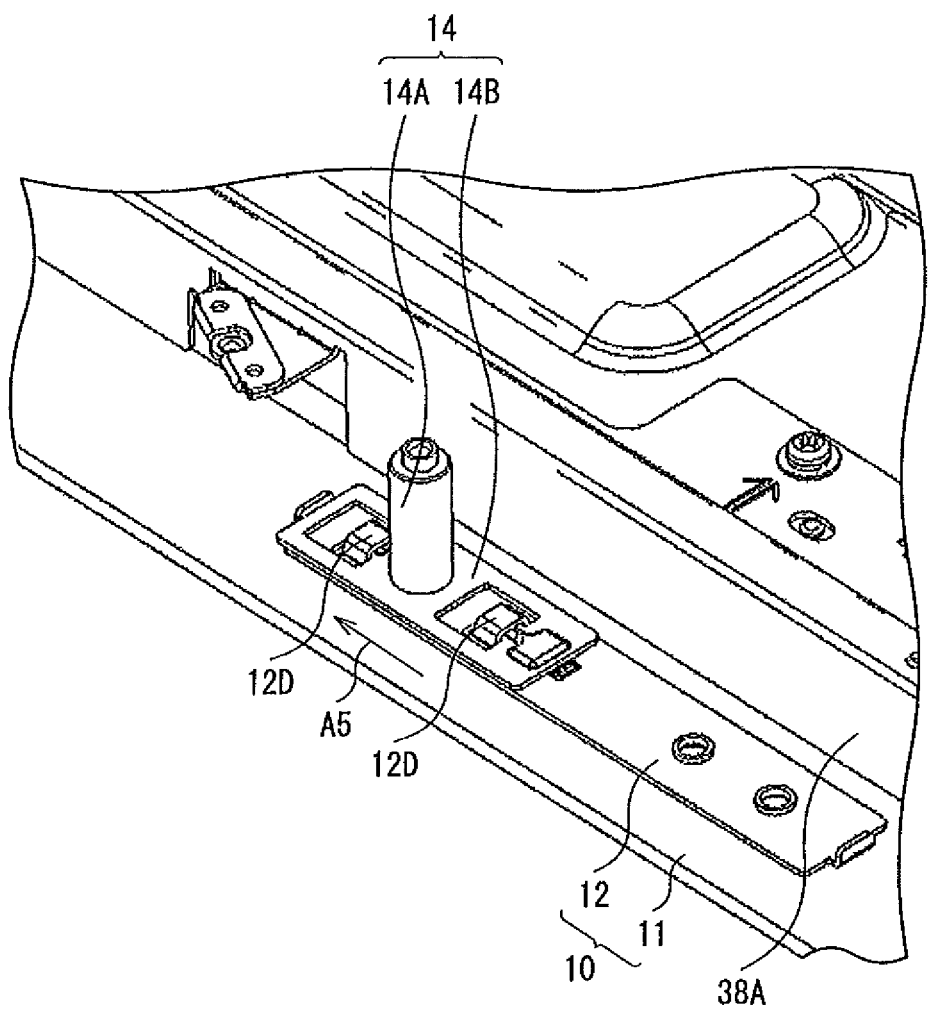
FIG. 15 is a perspective diagram illustrating a way of mounting the stud illustrated in FIG. 12.

On the other hand, the bottom 12A of the mounting frame 12 is provided with a bridge section 12D capable of locking the sliding-use projection 14C passing therethrough. Therefore, it is possible to remove the stud 14 from the mounting frame 12 by moving the stud 14 in a direction indicated by an arrow A4 as illustrated in FIG. 14, and also attach the stud 14 to the mounting frame 12 by moving the stud 14 in a direction indicated by an arrow A5 as illustrated in FIG. 15.

This display device 1 may be assembled as follows, for example.

First, the front plate 10 and the display panel 30 configured as described above are prepared, and the front plate 10 and only the panel main body (image display section) 31A of the display panel 30 are bonded across the respective surfaces by the adhesive layer 20. Subsequently, remaining components of the display panel 30 are disposed within the mounting frame 12 of the front plate 10. Next, the front plate 10 and the display panel 30 are coupled by loosely inserting the locking section 52 of the mounting member 50 into the long hole 12C of the mounting frame 12, and securing the fixed section 51 to the back chassis 32 of the display panel 30 by screw fixation.

Here, the fixed section 51 of the mounting member 50 is fastened to the back face of the display panel 30, and the locking section 52 is loosely inserted into the long hole 12C in the mounting frame 12 of the front plate 10 and thus, it is possible to couple the front plate 10 and the display panel 30 without using a mounting stud or a bezel usually used. In addition, as compared to a case where a standing mounting boss is provided, a change in external form and an increase in dimensions of the display panel 30 caused by providing the mounting member 50 are remarkably small. Therefore, it is possible to narrow the frame and reduce the thickness.

Subsequently, the rear cover 40 configured as described above is prepared, and in a direction indicated by an arrow A6 illustrated in FIG. 12, this rear cover 40 is placed on the back face of the display panel 30, and the upper, right, and left edges are pressed down. As a result, at the upper edge of the rear cover 40, the concave section 41 of the rear cover 40 is engaged with the standing wall 35 of the back chassis 32 and thereby displacement in the Y direction (vertical direction) is restricted, and also, the claw 42 of the rear cover 40 is fitted in the bag-like section 37 between the protruding section 36 and the front plate 10 and therefore displacement in the Z direction (front-back direction) is restricted. Therefore, the back chassis 32 as well as the middle chassis 33 and the rear cover 40 are fixed without using a screw, and the rear cover 40 is prevented form being misaligned or dropping off. In addition, at the right and left edges of the rear cover 40, the concave section 41 of the rear cover 40 is engaged with the standing wall 35 of the back chassis 32, and therefore displacement in the X direction (lateral direction) is restricted. It is to be noted that at the right and left edges of the rear cover 40, screw fixation may be used together to restrict movement in the Z direction (front-back direction).

Subsequently, at the lower edge of the front plate 10, the stud 14 is moved in the direction indicated by the arrow A5, and therefore the sliding-use projection 14C of the stud 14 is caused to pass through the bridge section 12D in the bottom 12A of the mounting frame 12 and locked, so that the stud 14 is attached to the mounting frame 12. Using this stud 14, the lower edge of the rear cover 40 is secured to the mounting frame 12 through screw fixation. As a result, the main section 2 illustrated in FIG. 1 and FIG. 2 is formed. The display device 1 illustrated in FIG. 1 is completed by causing the stand 3 to support this main section 2.

In this way, in the present embodiment, the fixed section 51 of the mounting member 50 is fixed to the back face of the display panel 30, and the locking section 52 is loosely inserted into the long hole 12C of the mounting frame 12 of the front plate 10. Therefore, the front plate 10 and the display panel 30 may be coupled without using a mounting stud or a bezel which are usually used, and thus it is possible to narrow the frame and reduce the thickness.

In particular, the locking section 52 is allowed to move, within the long hole 12C, in the longitudinal direction of the long hole 12C and in the direction passing through the long hole 12C and therefore, when a thermal contraction difference occurs between the back chassis 32 made of metal and the front plate 10 made of glass, the thermal contraction difference may be eased by the mounting member 50, and breakage and damage in the front plate 10 due to the thermal contraction difference may be suppressed.

Further, in particular, the standing walls 35 projecting toward the rear cover 40 are provided on the periphery of the display panel 30, and the concave sections 41 to engage with the standing walls 35 are provided inside the rear cover 40. Therefore, the displacement in the Y direction (vertical direction) at the upper edge or the displacement in the X direction (lateral direction) at the right and left edges between the display panel 30 and the rear cover 40 may be suppressed without using a screw, and misalignment and falling off of the rear cover 40 may be restricted.

Furthermore, in particular, while the claw 42 is provided inside the upper edge of the rear cover 40, the protruding section 36 is provided at the upper edge of the display panel 30, and the bag-like section 37 allowing the claw 42 to be fit therein is provided between this protruding section 36 and the front plate 10. Therefore, the upper edge of the display panel 30 and the upper edge of the rear cover 40 may be fixed without using a screw and the rear cover 40 may be prevented from being misaligned and dropping off.

In addition, particularly, the stud 14 is provided at the lower edge of the mounting frame 12 and this stud 14 is removably attachable to the mounting frame 12 and thus, it is possible to avoid damage to the driving circuit board 38 and the like due to contact with the stud 14 at the time of repair of the display device 1. This is extremely effective, especially when the front plate 10 and the display panel 30 are bonded together across the respective surfaces by the adhesive layer 20, and separation of the display panel 30 from the front plate 10 is not allowed at the time of repair of the display device 1.

[Modification 1]

Figure 16:
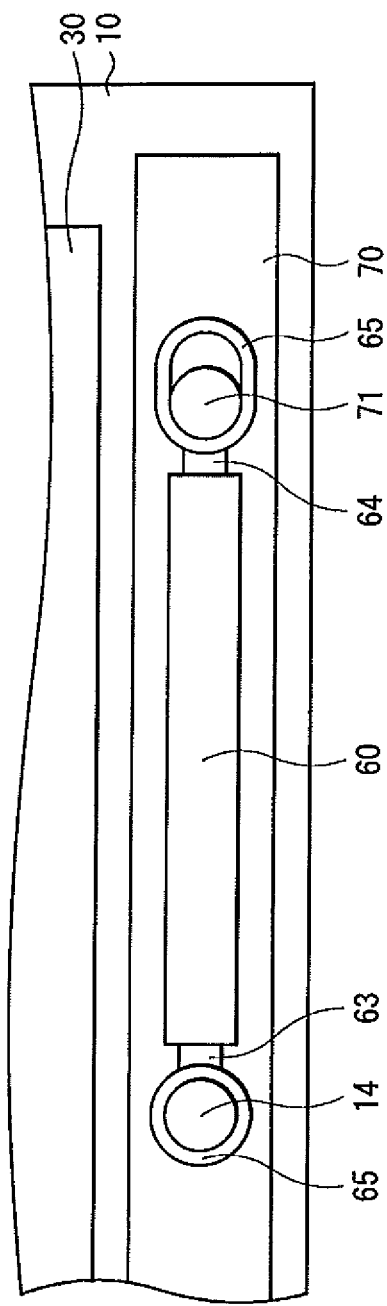
FIG. 16 is a plan view illustrating a structure of lower edges of a front plate and a display panel according to a modification 1.

FIG. 16 illustrates a structure of the lower edge of the front plate 10 according to the modification 1 of the present disclosure. In this modification 1, when a speaker box 60 is attached to the lower edge of the front plate 10, the stud 14 for mounting the rear cover 40 is used. Except for this point, the modification 1 is similar to the embodiment described above and thus, the same elements as those of the above-described embodiment will be provided with the same reference characters as those of the above-described embodiment, and the description thereof will be omitted.

At the lower edge of the front plate 10, a bracket 70 used for mounting a speaker and made of a resin material is provided. This bracket 70 has a single stud 71. This stud 71 is integrally molded with the bracket 70 by the resin material.

Figure 17:
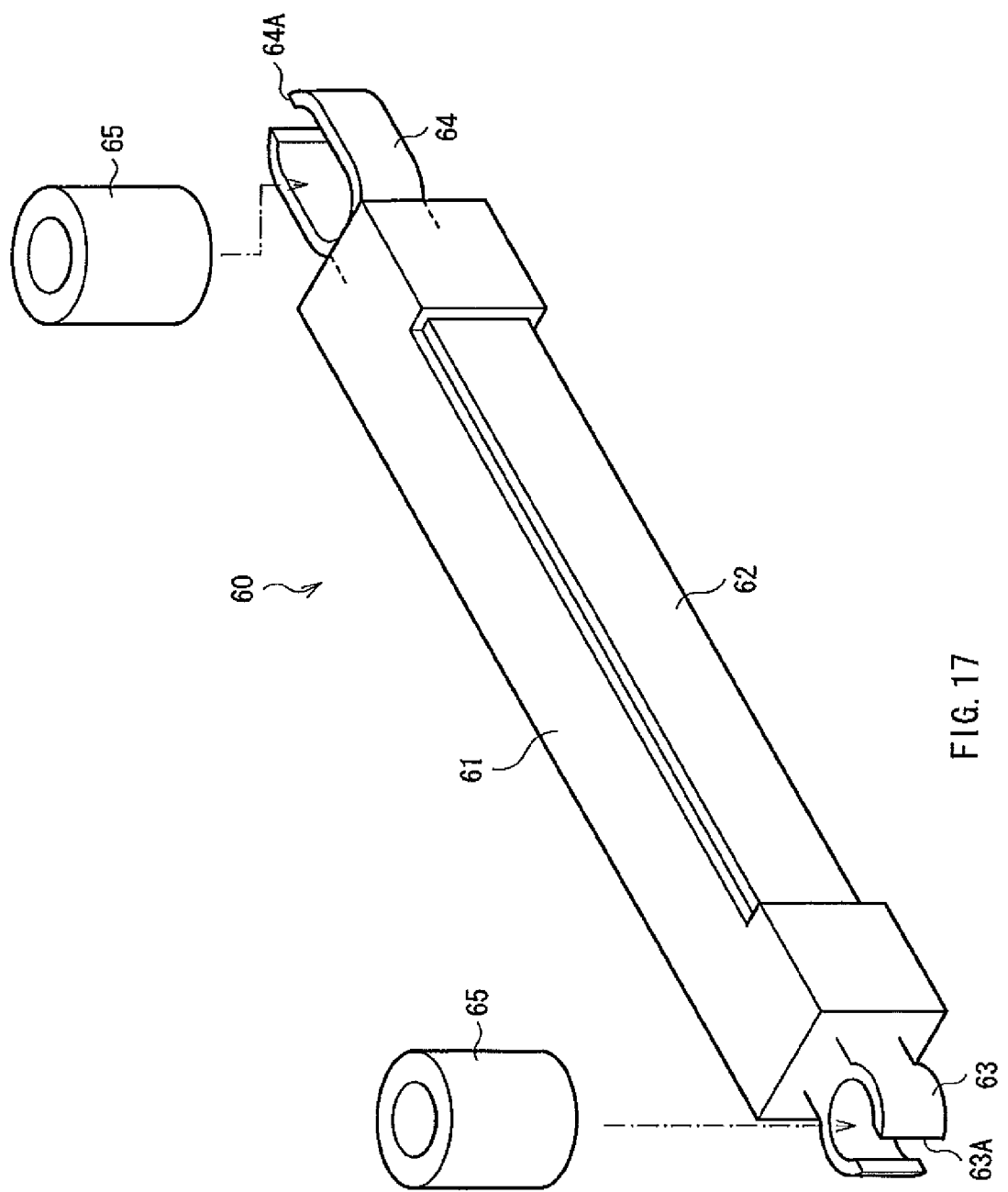
FIG. 17 is a perspective diagram illustrating a structure of a speaker box illustrated in FIG. 16.

FIG. 17 illustrates a structure of the speaker box 60 illustrated in FIG. 16. The speaker box 60 has a speaker unit 62 built in an exterior member 61 in a slim shape. At both ends of the exterior member 61, a mounted section 63 to be mounted on the stud 14 removably attached to the mounting frame 12 and a mounted section 64 to be mounted on the stud 71 of the bracket 70 made of resin are provided. Fitted in the mounted sections 63 and 64 are cylindrical buffering members 65 made of an elastic material such as rubber. It is to be noted that the mounted sections 63 and 64 have fitting openings 63A and 64A into which the buffering members 65 are to be fitted.

Figure 18:
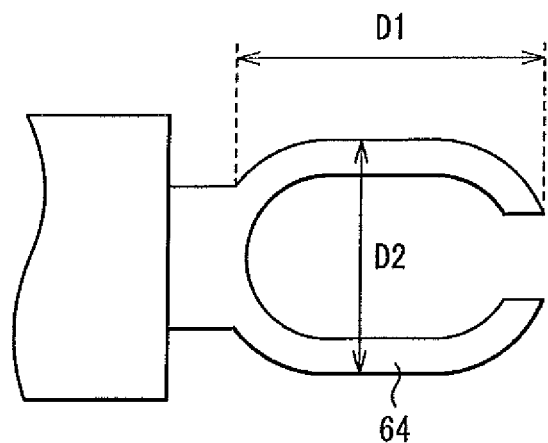
FIG. 18 is an enlarged plan view illustrating an end of the speaker box illustrated in FIG. 17.

As illustrated in an enlarged view of FIG. 18, in the mounted section 64, a dimension D1 in a longitudinal direction of the speaker box 60 is larger than a dimension D2 in a direction perpendicular to the longitudinal direction, i.e., the mounted section 64 is shaped like, for example, a track (see FIG. 18) or an oval (not illustrated). This makes it possible, in the present modification, to ease thermal fatigue of the mounted section 64 caused when thermal expansion and shrinkage of the front plate 10 or the bracket 70 are repeated.

In other words, in the present modification, the mounted section 63 is mounted on the stud 14 in the mounting frame 12 fixed to the front plate 10 and thus is displaced depending on thermal expansion and shrinkage of glass that is the material of the front plate 10. On the other hand, the mounted section 64 is mounted on the stud 71 of the bracket 70 made of resin and thus is displaced depending on thermal expansion and shrinkage of the resin. A difference in linear expansion coefficient between glass and resin is large, and there occurs a difference in expansion and contraction of 2 to 3 mm in a range of −40 degrees to 60 degrees Celsius. Here, in the present modification 1, the mounted section 64 is shaped like a track as described above and thus, an influence of the difference in expansion and contraction occurring between the glass and the resin is eased and the mounted sections 63 and 64 are displaced alike. Therefore, stress of extension and compression applied to the speaker box 60 is reduced, and structural deterioration, damage, or degradation in sound quality in the speaker box 60 is suppressed.

Figure 19:
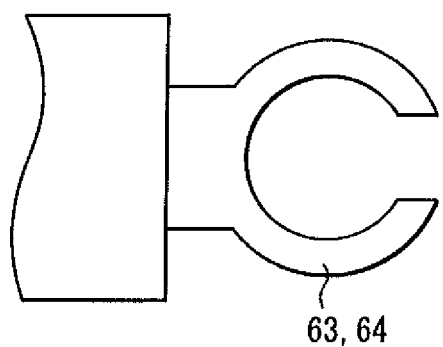
FIG. 19 is a plan view illustrating an end of a typical speaker box.

Meanwhile, as illustrated in FIG. 19, the mounted sections 63 and 64 are each shaped like a perfect circle, when assumed to be of a typical type. Therefore, when the mounted section 63 is mounted on the stud 14 and the mounted section is mounted on the bracket 70 made of resin, stress of extension and compression due to a difference in thermal expansion and shrinkage between glass and resin is applied to the speaker box 60. Accordingly, thermal fatigue occurs in the mounted sections 63 and 64, leading to structural deterioration, damage, or degradation in sound quality in the speaker box 60.

In order to address this situation, it is conceivable to provide two studs in the bracket 70, without using the stud 14 for mounting the speaker box 60. However, it is desirable to minimize the number of studs to narrow the frame.

In the present modification as described above, the mounted section 64 of the speaker box 60 has the dimension D1 in the longitudinal direction of the speaker box 60 larger than the dimension D2 in the direction perpendicular to the longitudinal direction. Therefore, it is possible to reduce the influence due to the difference in thermal expansion and shrinkage between glass and resin, and thereby suppressing structural deterioration, damage, or degradation in sound quality in the speaker box 60.

In addition, it is possible to attach the mounted section 63 of the speaker box 60 to the stud 14 on the mounting frame 12, without providing the bracket 70 with two studs and thus, the present modification is further advantageous in narrowing the frame.

It is to be noted that the modification 1 has been described for the case in which the mounted section 64 is shaped like a track or an oval, but the buffering member 65 may not be shaped like a perfect circle and may be shaped like a track or an oval instead. Alternatively, the mounted section 63 may be shaped like a track or an oval, and the buffering member 65 also may be shaped like a track or an oval. Further, both of the mounted sections 63 and 64 may be track-shaped or oval.

Up to this point, the present technology has been described by using the embodiment, but the present technology is not limited to the embodiment and may be variously modified. For example, the embodiment has been described for the case where the front plate 10 and the display panel 30 are bonded across the respective surfaces by the adhesive layer 20, but the present technology is applicable to a case where the adhesive layer 20 is not provided and air (air gap) is present in the space between the front plate 10 and the display panel 30.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
    a front plate having a transparent board and a mounting frame, the mounting frame having a bottom attached to a back face of the transparent board and a side perpendicular to the bottom and a long hole in the side;
    a display panel disposed on a back face side of the front plate; and
    a mounting member having a fixed section fixed to a back face of the display panel and a locking section extending from the fixed section and loosely inserted into the long hole of the mounting frame to be movable in a longitudinal direction of the long hole which is parallel to an X-axis and in a direction passing through the long hole and perpendicular thereto and which is parallel to a Y-axis and non-movable in a front-back direction which is perpendicular to a display surface of the display panel and which is parallel to a Z-axis, in which the X-axis, the Y-axis and the Z-axis are orthogonal to each other, the locking section having a first portion, a second portion and a third portion arranged such that the first portion extends from the fixed section at a slant to the second portion which extends along the side of the mounting frame to the third portion which is bent so as to be substantially parallel to the fixed section and insertable into the long hole of the mounting frame, and the third portion of the locking section being (i) movable in the long hole in the longitudinal direction which is parallel to the X-axis and in the perpendicular direction thereto which is parallel to the Y-axis to enable movement due to thermal contraction differences in the directions parallel to the X-axis and the Y-axis, and (ii) non-movable in the front-back direction which is parallel to the Z-axis to cause the front plate and the display panel to be fixed together and non-movable in the front-back direction.

2. The display device according to claim 1, wherein the display panel has a panel main body and a back chassis covering a back face side of the panel main body and made of a metallic material, and the fixed section of the mounting member is fixed to the back chassis.

3. The display device according to claim 2, wherein a rear cover is disposed on the back face side of the display panel, a standing wall projecting toward the rear cover is provided on a periphery of the display panel, and a concave section engaged with the standing wall is provided inside the rear cover.

4. The display device according to claim 3, wherein the standing wall is provided in the back chassis.

5. The display device according to claim 4, wherein a claw is provided inside the rear cover, a protruding section is provided on a periphery of the display panel, and a bag-like section capable of holding the claw is provided between the protruding section and the front plate.

6. The display device according to claim 5, wherein the rear cover is made of a resin material, the display panel has a middle chassis provided between the panel main body and the back chassis and made of a resin material, and the protruding section is provided in the middle chassis.

7. The display device according to claim 1, further comprising:

an adhesive layer between the front plate and the display panel, wherein the front plate and the display panel are bonded across an entire surface of the display panel.

8. The display device according to claim 7, wherein a stud is provided at a lower edge of the mounting frame, and the stud is removably attachable to the mounting frame.

9. The display device according to claim 1, in which the display panel includes a liquid crystal display element.

10. The display device according to claim 1, in which the front plate and the display panel are coupled together by use of the mounting member without a bezel.

11. The display device according to claim 1, in which the second portion extends in a direction which is substantially perpendicular to the third portion and the fixed section.

* * * * *